United States Patent [19]
Grathoff

[11] Patent Number: 5,501,563
[45] Date of Patent: Mar. 26, 1996

[54] BULK MATERIAL LOADING AND UNLOADING FACILITY FOR SEA-GOING SHIPS

[75] Inventor: Hartmut Grathoff, Wendelstein, Germany

[73] Assignee: Man Gutehoffnungshutte, Oberhausen, Germany

[21] Appl. No.: 187,615

[22] Filed: Jan. 27, 1994

[30] Foreign Application Priority Data

Feb. 6, 1993 [DE] Germany .................. 43 03 481.0

[51] Int. Cl.$^6$ ........................................ B63B 27/22
[52] U.S. Cl. ........................ 414/137.1; 414/137.7; 414/137.9; 414/138.7; 414/139.3; 414/786
[58] Field of Search .................. 414/137.5, 137.7, 414/137.9, 138.7, 139.1, 139.3, 786, 137.1

[56] References Cited

FOREIGN PATENT DOCUMENTS

| | | | |
|---|---|---|---|
| 1273322 | 8/1961 | France .................. | 414/137.9 |
| 2379457 | 2/1977 | France . | |
| 2643707A1 | 4/1977 | Germany . | |
| 2548900A1 | 5/1977 | Germany . | |
| 3520368A1 | 12/1986 | Germany . | |
| 3332668C2 | 6/1987 | Germany . | |
| 3504587C2 | 8/1987 | Germany . | |
| 3624734 | 2/1988 | Germany .................. | 414/137.9 |
| 3903550A1 | 8/1990 | Germany . | |
| 4037129A1 | 5/1992 | Germany . | |
| 54-80990 | 6/1979 | Japan . | |
| 55-148687 | 11/1980 | Japan . | |
| 221018 | 10/1986 | Japan .................. | 414/137.9 |
| 2-3591 | 1/1990 | Japan . | |

OTHER PUBLICATIONS

Author: N. N., Title: Neue Umschlagverfahren auf Offener See, Textbook in: dhf 7/8, 1986, S. 44.
Author: Schönknecht, Rolf, Title: Umschlagsysteme in Binnenhäfen, Textbook in: Seewirtschaft, Berlin 20 (1988) 4.
Author: N. N., Title: Umbau zum Erzumschlagschiff bei AG "WESER", Textbook in: Schiff & Hafen Kommandobrücke, H. 10, 1982, 34. Jb. S. 42.
Author: Flügger, W., Title: Kraftwerke auf Schwimmkörpern, Textbook in: Schiff & Hafen/Kommandobrücke, H. 9, 1982 34. Jg., S. 203–206.

Primary Examiner—David A. Bucci
Assistant Examiner—Janice L. Krizek
Attorney, Agent, or Firm—McGlew and Tuttle

[57] ABSTRACT

A bulk material loading and unloading facility for sea-going ships with displaceably arranged bulk material loading and unloading devices (23). Instead of a pier or a dock facility and a shore-side storage facility equipped with stackers and reloading devices and the conveyor belt units needed for them, a trough-shaped bulk material storage facility (14) is arranged on the ocean bottom (3) at a water depth that is safely navigable for sea-going ships, and rails (22) are laid on the side walls (15) of the bulk material storage facility. Loading and unloading devices (23) travel on these rails, and the loading and unloading devices (23) convey bulk material from ships (28) into the trough-shaped storage facility (14), or onto a conveyor belt unit (25) leading from this storage facility directly to a bulk material processing facility (e.g., a coal-fired power plant). The loading and unloading devices (23) can also convey bulk material from the trough-shaped bulk material storage facility (14) onto the conveyor belt (25) or into ships (28).

13 Claims, 6 Drawing Sheets

BULK MATERIAL LOADING AND UNLOADING FACILITY FOR SEA-GOING SHIPS

FIELD OF THE INVENTION

The present invention pertains to a bulk material loading and unloading facility for sea-going ships with one or more, displaceably arranged bulk material loading and unloading devices and with conveyor belt units leading further to the surface bunkers of a bulk material processing facility or the like.

BACKGROUND OF THE INVENTION

Large-capacity ocean cargo ships, loaded with bulk material, need a harbor for loading and unloading the bulk material, which is adapted to the dimensions of the ship. The cargo ship may have to be towed to the loading and unloading pier by means of a tugboat.

Bulk material loading and unloading facilities in the harbor require considerable investment.

SUMMARY AND OBJECTS OF THE INVENTION

It is an object of the present invention to provide a loading and unloading facility, in which the investment amounts to only a fraction of the cost hitherto incurred. The operating costs and the environmental pollution shall also be markedly reduced.

According to the invention, a bulk material loading and unloading facility is provided for sea-going ships including one or more displaceably arranged bulk material loading and unloading devices and with conveyor belt units leading to surface bunkers of a bulk material processing facility or the like. At least one trough-shaped bulk material storage facility is anchored in water on the ocean bottom. Rails are attached to two longitudinal walls of the trough-shaped bulk material storage facility. One or more bulk material loading and unloading devices is provided traveling on the rails. A conveyor belt is provided led from the trough-shaped material storage facility, over pile bridges to the surface bunker facility. The conveyor extends in parallel to the trough-shaped bulk material storage facility and may be arranged either inside or outside of the facility.

The trough-shaped bulk material storage facility according to the present invention is built off-shore in a water depth that is still safely navigable for large sea-going ships.

A conveyor belt unit is led from this trough-shaped bulk material storage facility to the surface bunkers of a bulk material processing facility or to a bulk material loading and unloading facility. Rails, on which one or more bulk material loading and unloading devices travel, are attached to both longitudinal walls of the bulk material storage trough. These bulk material loading and unloading devices convey the bulk material from sea-going ships anchored alongside the trough either into the trough, used as an intermediate storage facility, or, via the conveyor belt unit, directly to the surface bunkers on shore.

Bulk material loading and unloading devices are defined here as prior-art rail-bound unloading devices or devices which are able to assume both unloading and loading functions.

These bulk material loading and unloading devices also convey the bulk material into surface bunkers or the like even after the unloaded seagoing ship has departed. If necessary, the loading and unloading devices may also be provided with stacker booms and they can convey bulk material from the trough-shaped bulk material storage facility directly into ships.

One or two loading and unloading devices of the same type are usually installed on the trough-shaped bulk material storage facility.

When a sea-going ship is being unloaded, both devices are used as ship unloaders and fill the bulk material storage facility and/or the surface bunkers via a conveyor belt unit.

Bulk material loading and unloading devices, which are used especially to supply a facility located near the shore, are in operation usually only for a relatively few number of hours annually. As was mentioned above, the loading and unloading devices according to the present invention can also serve as storage facility loading and unloading devices and are therefore better utilized.

The bulk material loading and unloading facility according to the present invention can also be used such that the conveyor belt unit leading to the shore ends at a railroad car- or truck-loading facility. Further transport to users, etc., can then take place by rail or truck.

The bulk material loading and unloading devices on the bulk material storage facility according to the present invention can also be utilized in a more versatile manner in such a way that, e.g., bulk material can optionally temporarily be conveyed to the railroad car-loading facility from the storage trough via a branch line of the conveyor belt unit leading to shore, or it is conveyed to a facility located near the shore on a conveyor belt unit leading further after shutting off the branch line.

A separate storage area on land as well as any possible stackers and reloaders are omitted in the bulk material loading and unloading process.

The trough-shaped bulk material storage facility according to the present invention may also be used analogously for such bulk materials as coal, ores, or the like, which are transported to shore on ships, are intermediately stored in the coastal area, and are subsequently transported farther by other ships or conveyor belt units.

The conveyor belt unit consists of a single conveyor belt, while the conveyor belt units for coaling plants of power plants are formed by a plurality of individual conveyor belts with corresponding transfer points, etc., in conventional bulk material loading and unloading facilities.

The operating costs of the facility according to the present invention are lower than those of loading and unloading facilities according to the state of the art because of the small number of loading and unloading devices and their better utilization.

The ship placed on the ocean bottom or the loading and unloading storage facility formed by sheet pilings can be readily disassembled, without major disadvantages for nature, after the end of its useful life (e.g., 40 years).

The impairment of the landscape during the time of operation of the loading and unloading facility remains within limits.

Since the bulk material is stored in containers that are closed all around, a substantially smaller percentage of fine dust is carried away by the wind, or dust formation can be suppressed substantially more easily. Measures against the spontaneous ignition of bulk material can also be carried out with greater ease. Instead of only one scrapped cargo ship, it is also possible to use a plurality of ships one behind the other as trough-shaped bulk material storage facilities on the ocean bottom.

The ship placed on the ocean bottom or the bulk material storage facility formed by sheet pilings can also be expanded by arranging another storage facility of approximately equal size in parallel to the first one. The ship unloader or unloaders traveling on the longitudinal walls of the first bulk material storage facility can convey bulk material from a ship via a stacker boom optionally into one of the two trough-shaped storage facilities or to the conveyor belt unit, or from one of the two storage facilities into the other, or to the conveyor belt unit, or into a ship.

The trough of the bulk material storage facility can be designed as follows:

The deck of a scrapped cargo ship is removed above the area of the cargo spaces. The side walls of the cargo spaces are extended in the upward direction. Rails, on which the bulk material loading and unloading devices can travel, are laid on the top edge of the raised side walls. The scrapped ship is placed on the ocean bottom by filling with ballast its hollow spaces between the cargo spaces and the outer skin of the ship, on the one hand, and bulge, and, on the other hand, the hollow spaces of the bow and stern, which hollow spaces are used to generate buoyancy, so that the weight of the ship itself will become heavier than its buoyancy. Individual cargo spaces, which are not or will not be loaded with coal or the like material, may be flooded with water and again freed when necessary.

The ship is grounded approximately at right angles to the coastline, with the bow directed seaward, so that surf will be offered the least possible resistance.

As an alternative, sheet pilings, which form a long rectangle, are driven into the ocean bottom if it is not rocky. If necessary, cross bulkheads, which also consist of sheet pilings, are driven into the ocean bottom within the rectangle. These cross bulkheads are used as reinforcements of the long side walls and to divide the storage space into a plurality of individual storage units, e.g., when different types of bulk material are to be stored separately. The top edge of the sheet pilings forming the rectangle is located so high above the high-water line that no waves can pass over it. The interior space of the rectangle formed from the sheet pilings is pumped empty after it has been finished and used as a storage facility.

The ocean bottom within the trough formed from sheet pilings receives a drainage in order to pump off leakage water. A cover layer, e.g., asphalt, can be applied to the bottom. However, if bulk material of the same type is always stored, it might be advantageous to stack the bulk material directly on the ocean bottom and to always leave a certain lowermost layer of bulk material during the removal of the stack.

Exemplary embodiments of the present invention with respect to a near-shore coal-fired power plant, as well as the arrangement of a bulk material loading and unloading facility in a harbor will be explained below on the basis of schematic drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
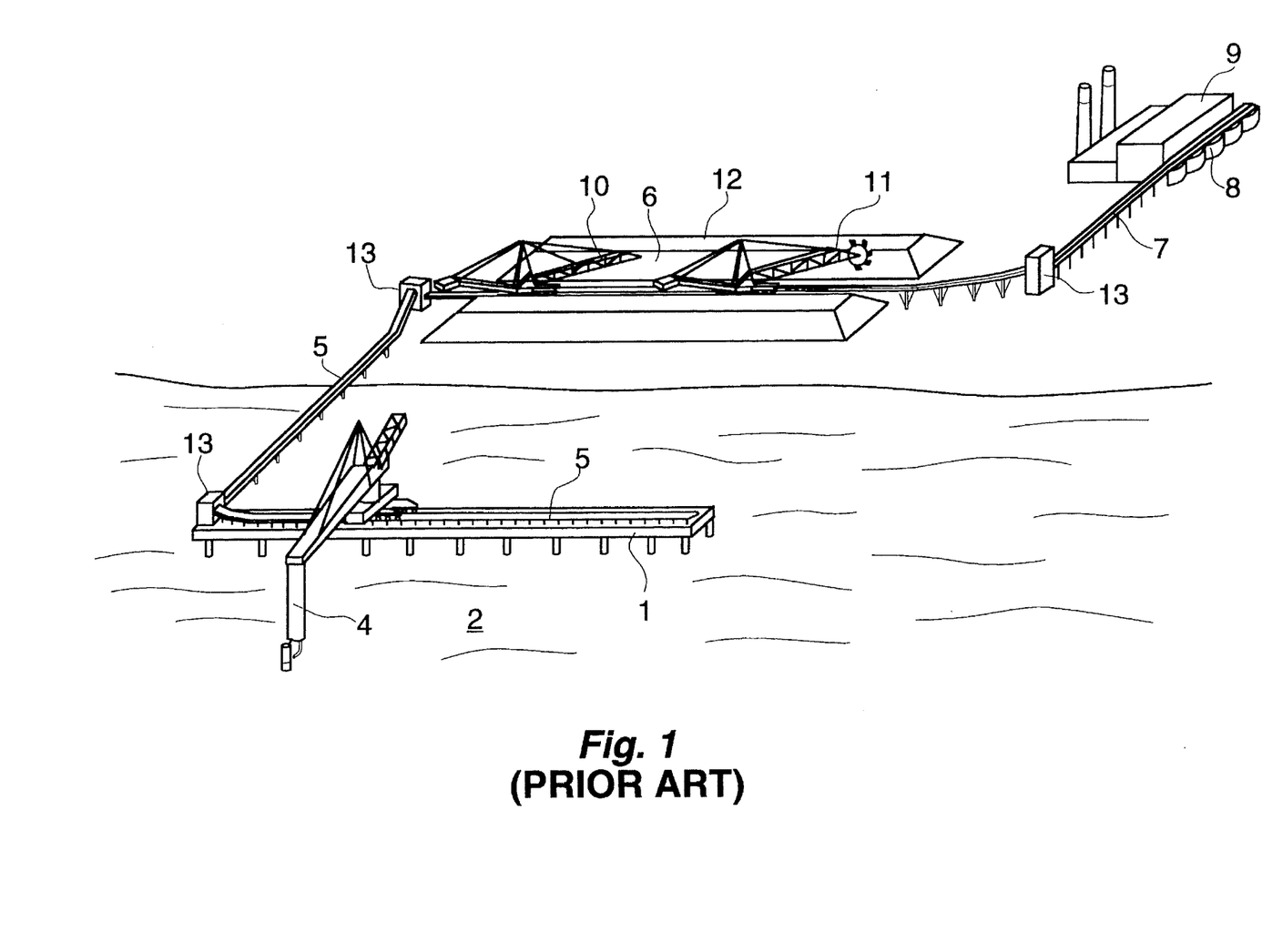
FIG. 1 is a perspective view of a prior-art loading and unloading facility.

FIG. 1 shows a loading and unloading facility belonging to a sea harbor for a near-shore power plant. The facility consists of a pier 1 with a conveyor belt unit 5 arranged on it. A ship unloader 4 traveling on rails is installed on the pier 1, situated in the ocean or sea harbor 2. A conveyor belt unit 5, which conveys bulk material to one or more storage area conveyor belt units 6, leads from the pier 1 to the intermediate storage area. Another conveyor belt unit 7 leads from there to the surface bunkers 8 of a power plant 9. Storage area loading devices 10 and reloading devices 11, which can also be displaced on rails and stack and remove stockpiles 12 of bulk material to the left and right of their tracks, are arranged on the intermediate storage area. Corner towers 13, in which the belt transfer chutes, the belt drives, and the belt-tensioning stations are located, are indicated at the transfer points of the conveyor belt units.

Figure 2:
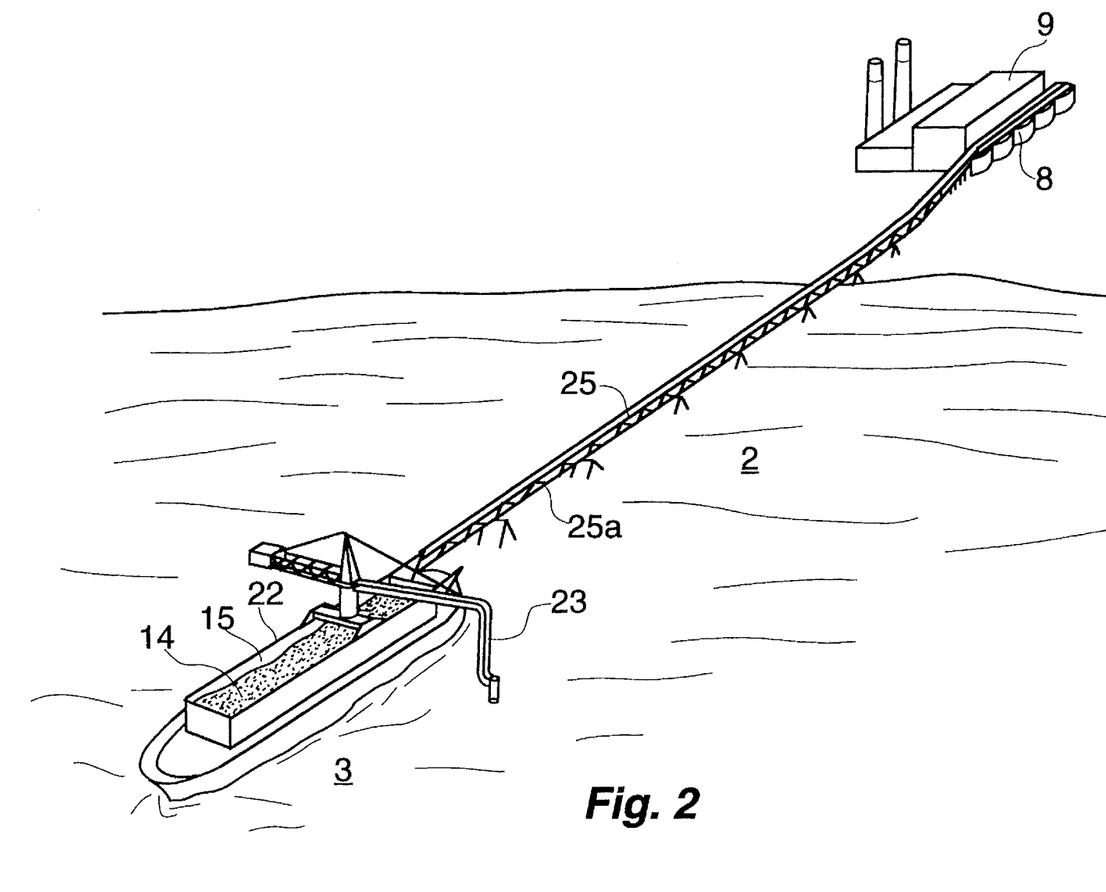
FIG. 2 is a perspective view of a loading and unloading facility according to the present invention off the shore.

FIG. 2 shows a bulk material loading and unloading facility according to the present invention for a near-shore power plant or other users. A trough-shaped bulk material storage facility 14, which consists of a scrapped, large cargo ship, is placed on the ocean bottom 3, and whose cargo space walls 15 have been laterally raised, is anchored on the ocean bottom 3 at a water depth that is still safely navigable for sea-going ships. One or more bulk material loading and unloading devices 23, which unload the bulk material from ships 28 and fill it into the trough-shaped bulk material storage facility 14, or feed it from the trough 14 or the ship 28 onto a conveyor belt 25, which is arranged laterally in the direction of the trough 14, is installed on the bulk material storage facility. From there, the bulk material is conveyed to the shore and up to the surface bunkers 8 of the power plant 9 or of another user via the conveyor belt unit (conveyor belt 25) leading farther on pile bridges 25a.

Figure 3:
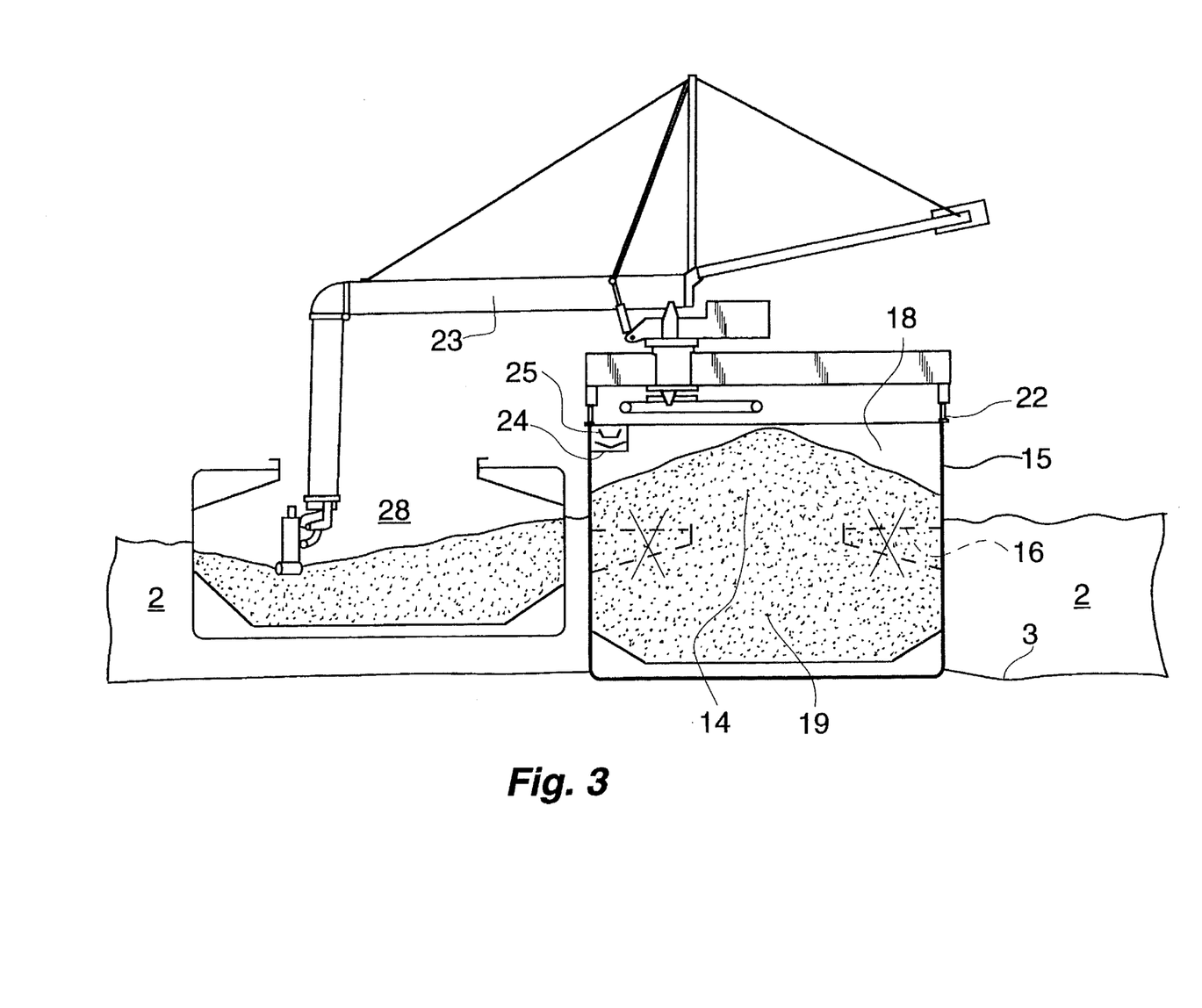
FIG. 3 is a cross sectional view through the bulk material loading and unloading facility.

FIG. 3 shows the cross section of a scrapped cargo ship 14, which is placed on the ocean bottom 3, and whose deck 16 has been removed in the area above the cargo spaces 19, and whose cargo space side walls 15 have been raised. Rails 22, on which one or more loading and unloading devices 23, which unload bulk material from the holds of sea-going ships 28 anchored alongside and transfer it into the trough 14 or onto a conveyor belt 25 extending at the edge of the trough, are laid on the upper edges of the raised side walls. The loading and unloading device 23 also assumes the function of a reloading device by also picking up bulk material from the trough 14 and transferring it onto the conveyor belt 25.

Figure 4:
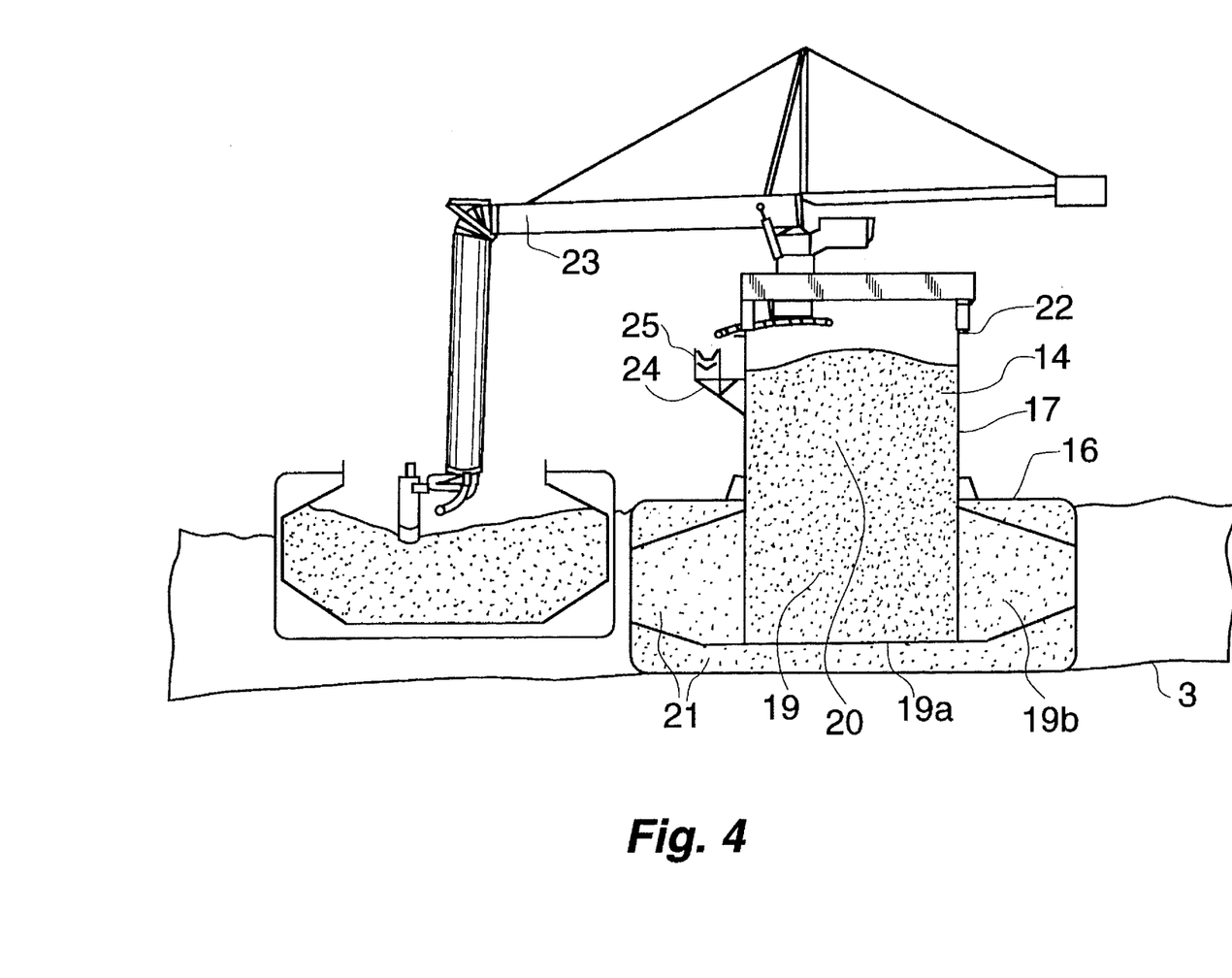
FIG. 4 is a cross sectional view through an alternative design of the bulk material loading and unloading facility.

FIG. 4 shows an arrangement similar to that in FIG. 3, the difference being that the deck 16 of the cargo ship placed on the ocean bottom 3 has not been removed. Corresponding to the layout of the ship's holds 20, bulkheads 17 are built from the bottom 19a of the cargo space up to the holds 20 and are extended in the upward direction beyond that. The rails 22, on which one or more traveling loading and unloading devices 23 are placed, are laid on the upper longitudinal edges of the bulkheads 17. The conveyor belt 25 is preferably arranged here on a support structure 24 outside a longitudinal wall (bulkhead longitudinal wall 17).

Figure 5:
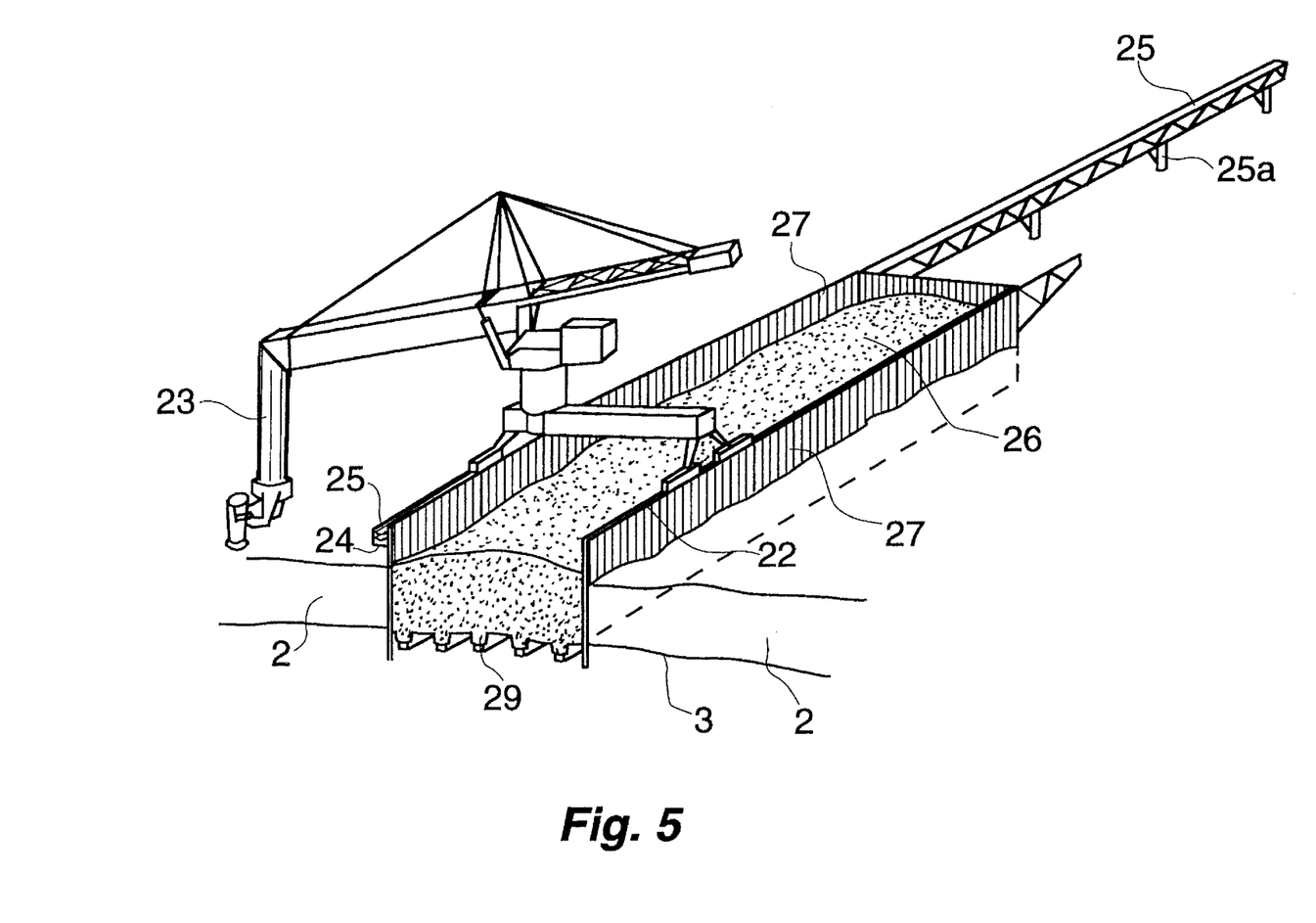
FIG. 5 is a cross sectional view through a bulk material loading and unloading facility formed by sheet pilings.

FIG. 5 shows an alternative trough-shaped bulk material storage facility 26, which consists of sheet pilings 27, which are driven into the ocean bottom 3. The rails 22, on which one or more bulk material loading and unloading devices 23 travel, are laid on the upper longitudinal edges of the sheet pilings 27. A conveyor belt 25 is laid on a support structure 24 along a wall of the trough longitudinal sheet piling 27, and the conveyor belt leads farther, via a pile bridge 25a, to land, and from there farther to the surface bunkers of a power plant or of another user.

The ocean bottom 3 within the trough 26 formed by the sheet pilings 27 has drainage canals 29, from which leakage water can be pumped off.

Figure 6:
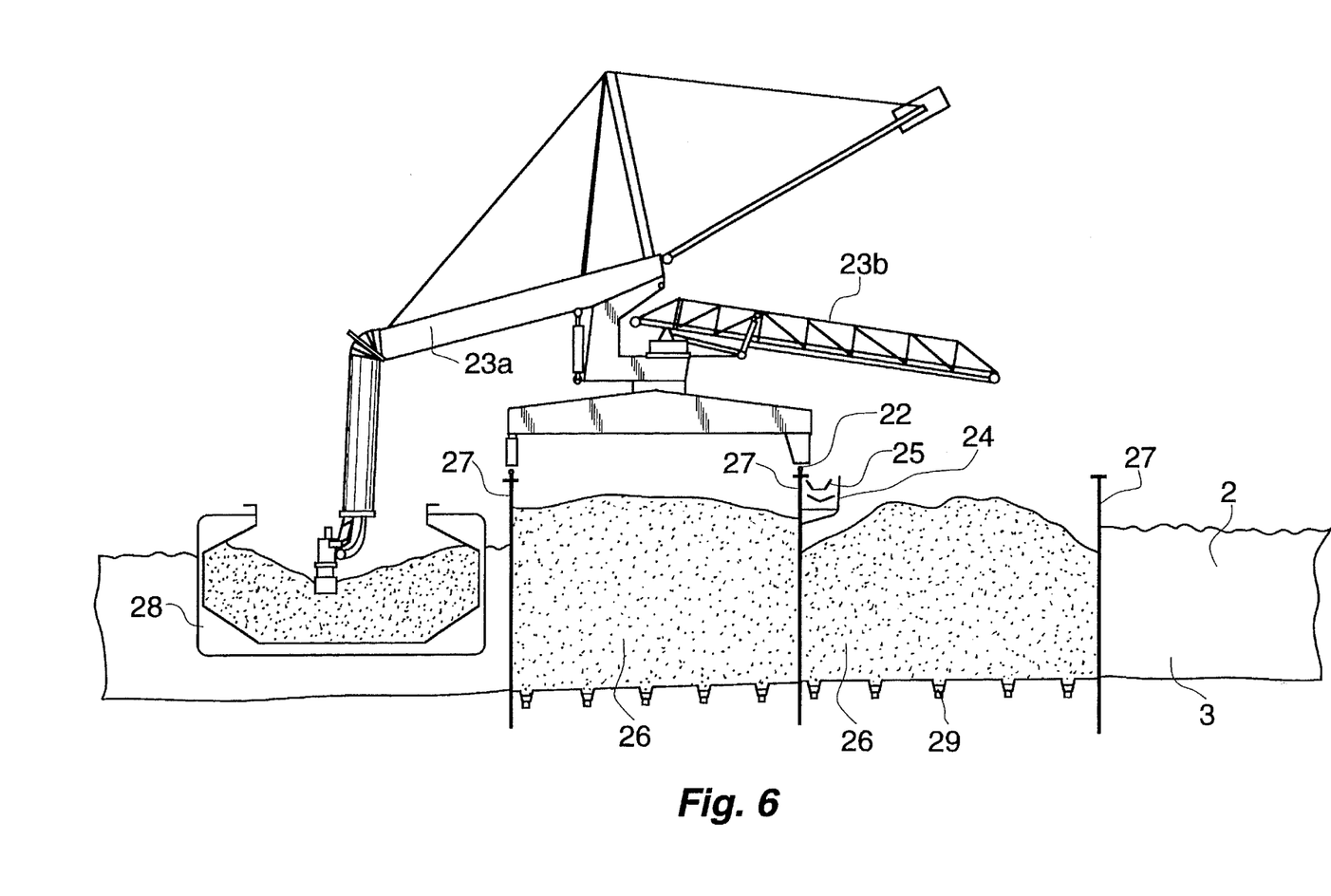
FIG. 6 is a cross sectional view through a bulk material loading and unloading facility with two bulk material storage troughs arranged in parallel.

FIG. 6 shows a trough-shaped bulk material storage facility 26, which has been expanded by a second trough 26 arranged in parallel to the first one. The bulk material loading and unloading device 23 travels on the longitudinal walls 27 of the first trough 26. Its stacker boom 23b, which can be moved independently from the material pick-up boom 23a, can load both the trough-shaped bulk material storage facilities 26 and the conveyor belt 25. However, the loading and unloading device 23 can also load the conveyor belt 25 or a ship 28 from the two troughs 26.

While specific embodiments of the invention have been shown and described in detail to illustrate the application of the principles of the invention, it will be understood that the invention may be embodied otherwise without departing from such principles.

APPENDIX

List of Reference Numerals

1 Pier (FIG. 1)
2 Water
3 Ocean bottom
4 Ship unloader (FIG. 1)
5 Conveyor belt unit (FIG. 1)
6 Storage area (FIG. 1)
7 Additional conveyor belt unit (FIG. 1)
8 Surface bunker
9 Power plant
10 Storage area loading device (FIG. 1)
11 Storage area reloading device (FIG. 1)
12 Bulk material stacks (FIG. 1)
13 Corner towers (FIG. 1)
14 Trough-shaped bulk material storage facility (made of a scrapped cargo ship)
15 Storage space walls of 14
16 Deck of the scrapped cargo ship
17 Bulkheads in the area of the holds 20
18 Cross bulkhead
19 Storage spaces
19a Storage space bottom
19b Storage space, used for ballast 21
20 Holds of the scrapped ship
21 Ballast
22 Rails
23 Bulk material loading and unloading device
24 Support structure for the conveyor belt
25 Conveyor belt (facility)
25a Pile bridges for 25
26 Trough-shaped bulk material storage facility (made of sheet pilings)
27 Sheet pilings of 26
28 Sea-going ship
29 Drainage

What is claimed is:

1. A bulk material loading and unloading facility for sea-going ships for transporting bulk material to surface bunkers of a bulk material processing facility, comprising:

a trough-shaped bulk material storage facility anchored in water of a body of water, on a bottom of the body of water, said trough-shaped bulk material storage facility being formed of a scrapped cargo ship which has been placed on said bottom of the body of water, said scrapped cargo ship having a removed deck and having side walls which have been raised to form a raised wall structure;

rails attached to two longitudinal walls of said trough-shaped bulk material storage facility;

a bulk material loading and unloading device traveling on said rails; and a conveyor belt extending from said trough-shaped bulk material storage facility to a surface bunker facility, on pile bridges, the longitudinal extent of said conveyor belt extending substantially in parallel to said longitudinal walls of said trough-shaped bulk material storage facility.

2. A facility in accordance with claim 1, wherein:

said two longitudinal walls are a portion of said raised wall structure.

3. A facility in accordance with claim 1, wherein:

hollow spaces between cargo spaces and an outer skin of said scrapped cargo ship are filled with ballast.

4. A facility in accordance with claim 3, wherein:

said hollow spaces include a bilge, and hollow areas in a bow and stern of said scrapped cargo ship.

5. A bulk material loading and unloading facility for sea-going ships for transporting bulk material to surface bunkers of a bulk material processing facility, comprising:

a trough-shaped bulk material storage facility anchored in water of a body of water, on a bottom of the body of water, said trough-shaped bulk material storage facility being a scrapped ship with a bulkhead extending into the ship to a cargo hold bottom of the ship, the bulkhead extending upwardly beyond a hold of the ship, the ship having a cargo space filled with ballast, outside of said bulkhead;

rails attached to two longitudinal walls of said trough-shaped bulk material storage facility;

a bulk material loading and unloading device traveling on said rails; and a conveyor belt extending from said trough-shaped bulk material storage facility to a surface bunker .facility, on pile bridges, the longitudinal extent of said conveyor belt extending substantially in parallel to said longitudinal walls of said trough-shaped bulk material storage facility.

6. A facility in accordance with claim 5, wherein:
said two longitudinal walls are a portion of said bulkhead.

7. A method for creating a bulk material loading and unloading facility for seagoing ships transporting bulk material, the method comprising the steps of:
providing a scrapped cargo ship;
adding a raised wall structure to said scrapped cargo ship, said raised wall structure extending above a waterline when said scrapped cargo ship is sunk;
sinking said scrapped cargo ship onto a bottom of a body of water;
attaching rails to said scrapped cargo ship;
providing a bulk material loading and unloading device traveling on said rails.

8. A method in accordance with claim 7, wherein:
said raised wall structure is a bulkhead extending from a bottom of a cargo space of said scrapped cargo ship to holds of said scrapped cargo ship.

9. A method in accordance with claim 7, further comprising:
removing a deck from said scrapped cargo ship;
adding said raised wall structure to side walls of said scrapped cargo ship.

10. A method in accordance with claim 7, wherein:
said sinking is performed by filling hollow spaces between cargo spaces and an outer skin of said scrapped cargo ship with ballast.

11. A method in accordance with claim 10, wherein:
said hollow spaces include a bilge, and hollow areas in a bow and stern of said scrapped cargo ship.

12. A method in accordance with claim 7, further comprising;
flooding cargo spaces in said scrapped cargo ship which are not being used in order to anchor said scrapped cargo ship on the bottom.

13. A method in accordance with claim 7, wherein:
said rails are attached to said raised wall structure.

* * * * *

UNITED STATES PATENT AND TRADEMARK OFFICE
CERTIFICATE OF CORRECTION

PATENT NO. : 5,501,563
DATED : March 26, 1996
INVENTOR(S) : Hartmut Grathoff

It is certified that error appears in the above-identified patent and that said Letters Patent is hereby corrected as shown below:

Title page, item [75], Assignee: should read -- MAN Gutehoffnungshutte, Oberhausen, Germany --.

Signed and Sealed this

Twentieth Day of August, 1996

*Attest:*

BRUCE LEHMAN

*Attesting Officer*     *Commissioner of Patents and Trademarks*